United States Patent
Rogers

[15] 3,680,257
[45] Aug. 1, 1972

[54] LANDSCAPING APPARATUS

[72] Inventor: Roy L. Rogers, 9880 W. 10th St., Indianapolis, Ind. 46234

[22] Filed: June 15, 1970

[21] Appl. No.: 46,100

[52] U.S. Cl. ........................................ 47/17, 47/37
[51] Int. Cl. ............................................ A01g 17/06
[58] Field of Search ................ 47/34, 37, 41, 44–45, 47/47, 1

[56] References Cited

UNITED STATES PATENTS

| | | | |
|---|---|---|---|
| 2,083,678 | 6/1937 | Wilson | 47/47 |
| 597,841 | 1/1898 | Dolf | 47/47 |
| 2,934,204 | 4/1960 | Pardee | 47/37 UX |
| 3,026,649 | 3/1962 | Barakauskas | 47/34 |

*Primary Examiner*—Robert E. Bagwill
*Attorney*—Woodard, Weikart, Emhardt & Naughton

[57] ABSTRACT

Landscaping apparatus which is mounted on the balled roots of a plant and used to train the portions of the plant growing above the ground. Two sections are bolted together about the ball of an evergreen plant. The upper portion of the apparatus includes diverging guide rods to which the evergreen branches are tied for shaping of the evergreen. After the branches are tied to the guide rods, the evergreen is pruned or trimmed in order to give a hand shape or finger shape appearance. Each of the two sections includes a concave element with outwardly projecting flanges at its ends. The concave elements are attached together around the ball by means of bolts through the flanges.

3 Claims, 5 Drawing Figures

PATENTED AUG 1 1972 3,680,257
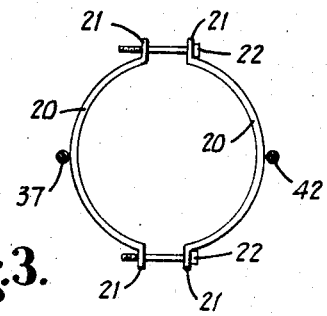
Fig.3.
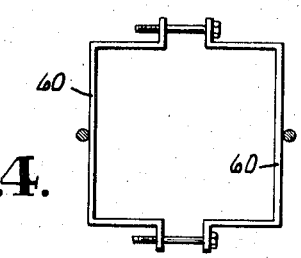
Fig.4.
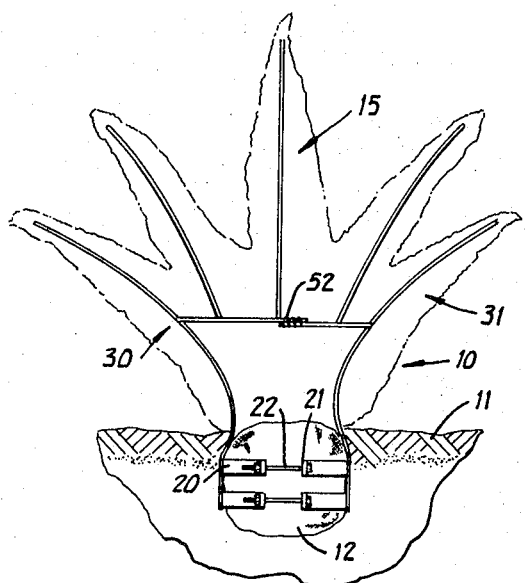
Fig.1.
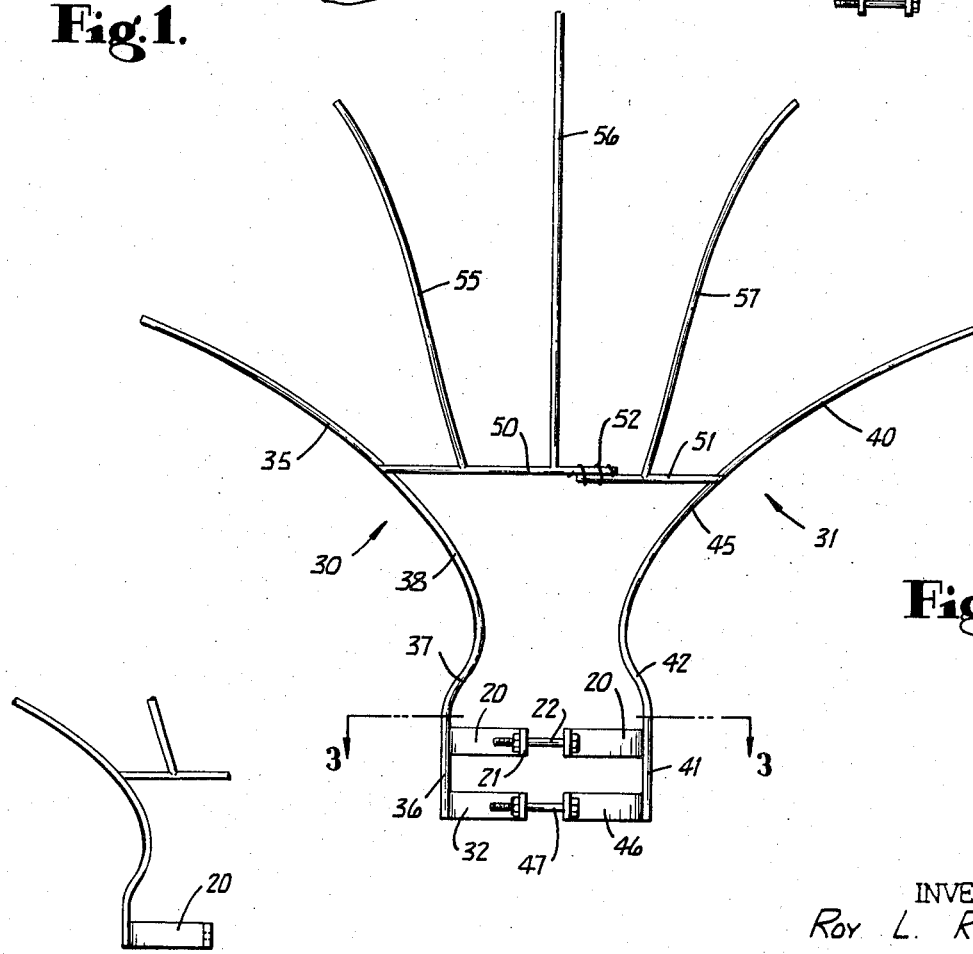
Fig.2.
Fig.5.
INVENTOR
Roy L. Rogers
BY
Woodard, Weikart, Emhardt & Naughton
ATTORNEYS

LANDSCAPING APPARATUS

BACKGROUND OF THE INVENTION

1. Field of the Invention

This invention relates to landscaping apparatus for training an evergreen or the like.

2. Description of the Prior Art

Various devices are known in the art for the training and trimming of shrubs and plants. Examples of these devices are shown in the U.S. Pats. to Fisher No. 1,895,282; Brownell No. 2,679,691; Worthington No. 2,764,846; and Presnick No. 2,917,868. It is desirable that improved means be provided for training plants, said means being adapted to accompany and be a part of the plant in a balled condition as well as in the ground.

SUMMARY OF THE INVENTION

One embodiment of the invention might include a landscaping apparatus for training a balled plant which comprises a first pair of concave elements having opposite ends, means for fixing said concave elements together at their ends about the ball of a plant, and a pair of plant supporting fingers extending upwardly from said concave elements and diverging from one another from their proximal to their distal ends.

There may also be provided a pair of inwardly projecting members each fixed at its proximal end to a respective one of said plant supporting fingers and further plant supporting fingers fixed to said inwardly projecting members and extending upwardly therefrom.

BRIEF DESCRIPTION OF THE DRAWINGS

FIG. 1 is a side elevation partially in section of an evergreen plant having landscaping apparatus of this invention mounted thereon and showing the plant in the ground;

FIG. 2 is an enlarged side elevation of the landscaping apparatus;

FIG. 3 is a horizontal section taken along line 3—3 of FIG. 2 in the direction of the arrows;

FIG. 4 is a section similar to FIG. 3 of an alternative embodiment of the invention; and FIG. 5 is a fragmentary side elevation of an alternative embodiment of the invention.

DESCRIPTION OF THE PREFERRED EMBODIMENT

Referring now more particularly to the drawing, there is illustrated an evergreen plant 10 which is planted in the ground 11 and which has a balled root system 12. Prior to planting the evergreen plant in the ground the root system 12 of the plant is in a balled condition in burlap or the like so that the plant can be moved from place to place but with the root system 12 protected. Secured to and about the root system 12 is a landscaping apparatus 15. Because the landscaping apparatus 15 is secured to the root system 12, it can accompany the plant from place to place fixed to the plant in exactly the manner that it will be related to the plant when the plant is finally in the ground.

The landscaping apparatus 15 includes a first pair of concave elements 20 which are flat metal straps and which have outwardly projecting flanges 21 at their opposite ends. Bolts 22 extend through the flanges 21 and secure the two concave members 20 together fixing the members to and about the ball 12 of the plant 10. Each of the members 20 is a part of one of two sections 30 or 31 of the landscaping apparatus 15. The section 30 includes the strap member or element 20 as well as an additional member or element 32 identical to the strap 20. These two elements are fixed in parallel relation by a plant supporting finger or rod 35 which extends vertically at its portion 36, curves inwardly at its portion 37 and then curves outwardly at its portion 38.

In similar fashion the section 31 includes a plant supporting finger or rod 40 which is vertical at 41, curves inwardly at 42 and curves outwardly at 45. The rod 40 is fixed to the straps 20 and 46 and maintains them in a parallel relationship. The two straps 32 and 46 are fixed together by bolts 47 similarly to the bolts 22 fixing the straps 20 together.

Each of the plant supporting fingers 35 and 40 has an inwardly projecting member 50 and 51 fixed thereto. When the landscaping apparatus of the present invention is assembled on a plant such as the plant 10, the inwardly projecting members 50 and 51 are forced through the foliage of the plant and are attached together by a wire 52 or by a bolt or any other suitable manner. The inwardly projecting members 50 and 51 have fixed thereto further plant supporting fingers 55, 56 and 57. The various plant supporting fingers or rods 35, 55, 56, 57 and 40 diverge from one another in the manner in which the fingers of the hand diverge from one another when they are spread.

After the apparatus illustrated in FIG. 2 has been attached to the plant when the plant is out of the ground so that the straps 20, 32 and 46 are secured to one another and the inwardly projecting members 50 and 51 are secured to one another, the branches of the plant are attached to the diverging fingers and the plant is trimmed or pruned until it assumes generally the configuration of FIG. 1. This pruning, trimming or training should be continued in order to cause the plant to eventually assume a very smooth attractive configuration suggested by FIG. 1.

FIG. 3 is a section along line 3—3 of FIG. 2 and shows that the straps 20, 32 and 46 have a semi-circular configuration with the flanges 21 projecting oppositely from the opposite ends of the straps. FIG. 4 is a view similar to FIG. 3 but showing an alternative embodiment of the invention in which the concave members 60 replacing the straps 20 have a squared off configuration so that the bolted together members 60 are generally square-shaped in cross-section.

FIG. 5 shows in fragmentary fashion a further alternative embodiment of the invention which is identical to the embodiment illustrated in FIG. 2 with the exception that the lower portion 36 of the plant supporting finger 35 is not quite as long as the embodiment of FIG. 2 and there is only a single strap or concave element 20 to be secured about the ball of the plant.

While the invention has been disclosed and described in some detail in the drawings and foregoing description, they are to be considered as illustrative and not restrictive in character, as other modifications may readily suggest themselves to persons skilled in this art.

The invention claimed is:

1. Landscaping apparatus for training a balled plant which comprises:
   a. a pair of concave elements having opposite ends, said concave elements being releasably and adjustably secured together to one another at their ends about the ball of a plant;
   b. a pair of plant supporting fingers secured to and extending upwardly from said concave elements and first converging toward one another and then diverging from one another from their proximal to their distal ends, each of said plant supporting fingers being secured to a respective one of said concave elements at the center thereof;
   c. a pair of inwardly projecting members each fixed at a proximal end to a respective one of said plant supporting fingers;
   d. means fixing the distal ends of said inwardly projecting members together,
   e. and further plant supporting fingers fixed to said inwardly projecting members and extending upwardly therefrom.

2. Landscaping apparatus as defined in claim 1 wherein said concave elements are semi-circular in configuration and have outwardly projecting flanges extending from said opposite ends, said means for fixing said concave elements together comprising bolts through said flanges.

3. Landscaping apparatus as defined in claim 1 additionally comprising an additional pair of concave elements with each of said additional pair fixed in parallel relation to a respective one of said first pair of concave elements and similarly secured to said plant supporting fingers.

* * * * *